(12) United States Patent
Williams, Jr.

(10) Patent No.: US 6,631,585 B1
(45) Date of Patent: Oct. 14, 2003

(54) INTERCROPPING PROCESS

(76) Inventor: Marvin J. Williams, Jr., 1411 Bell Ave., New Buffalo, MI (US) 49117

(*) Notice: Subject to any disclaimer, the term of this patent is extended or adjusted under 35 U.S.C. 154(b) by 0 days.

(21) Appl. No.: 09/752,956

(22) Filed: Jan. 2, 2001

(51) Int. Cl.[7] .................................................. A01G 1/00
(52) U.S. Cl. .................................................... 47/58.1 R
(58) Field of Search ...................................... 47/58.1 R

(56) References Cited

U.S. PATENT DOCUMENTS

| | | |
|---|---|---|
| 4,084,522 A | 4/1978 | Younger |
| 4,266,489 A | 5/1981 | Panamore |
| 4,611,683 A | 9/1986 | Hilmer |
| 4,729,514 A | 3/1988 | Ostrom |
| 5,140,917 A | 8/1992 | Swanson |
| 5,347,939 A | 9/1994 | Hood, Jr. et al. |
| 6,009,955 A | 1/2000 | Tarver, III |

FOREIGN PATENT DOCUMENTS

| | | | |
|---|---|---|---|
| CN | 1214191 A | * | 4/1999 |
| EP | 0132521 | | 2/1985 |

OTHER PUBLICATIONS

ATTRA, Intercropping Principles and Production Practices, Mar. 2001, p. 8.*
Renner KA et al. Influence of cultural practices on weed management in soybean. 1999. Journal of Production Agricultural: 12(1):7–8, 48–53. (abstract).*
Widdicombe, W.D. Effect of row spacing, hybrid selection, population, and planting date on corn. 2000. MS thesis (abstract).*
Theodore, S. Plant expansion fills growing product niche. 1999. Beverage Industry vol. 9 p. 32 (abstract).*
Organic Gardening, Sep./Oct., 1990, p. 40.
Schwerl, Successful small–scale farming, pp. 100–105.
Soil survey of Berrien County, Mich., U.S.D.A., Soil Conservation Service.
Rodule's all new encyclopedia of organic gardening.
Fertilizer recommendations for field crops in Michigan, Mar. 1992, Ext. Bull E–50cA, Mich. State University.
Koch, "Legume cover crop for no–till corn", p. 11, Role of Legumes in conservation tillage systems.
Decker et al, fall seeded legumes nitrogen contribut . . . Role of Legumes in Conservation Tillage systems.
Nannis et al, "Interseeding in corn," Role of Legumes in Conservation tillage systems.
Holderbar et al, "Forage contribution of winter Legume . . . ", Role of Legumes in conservation tillage . . . .
Scott et al, "Use of red clover in corn . . . ", Role of Legumes in conservation tillage systems.
Pandey et al, "Soybean as a green manure . . . " Experimental Agriculture 22:179–85 (1986).
Eadie et al, "Integration of cereal cover crops in Ridge Tillage . . . ", Weed Techn. 6(3):554(Jul./Aug. 1992).
"He's gone to 22 inch rows to boost yields, cut costs," No–till farmer–mid Jan./86.
"How 44 no–till planters measure up", no–till Farmer, mid–Jan. '86.

(List continued on next page.)

Primary Examiner—Peter M. Poon
Assistant Examiner—Jeffrey L. Gellner
(74) Attorney, Agent, or Firm—Adrienne B. Naumann

(57) ABSTRACT

A novel process for successfully intercropping corn and soybean plants is described herein. For best ecological results, the corn and soybeans are planted at specific predetermined distances at the same time of year. The corn and soybeans create a microclimate of humidity, as well as a root system and groundcover which effectively resists drought and erosion. Another advantage is use of conservation tillage which is compatible with the ecological longterm advantages of intercropping commercial annual grains and legumes.

12 Claims, 10 Drawing Sheets

OTHER PUBLICATIONS

Lesoing et al, "Strip intercropping effects on Yield components . . . " Agron , Jr. 91:807.

Legumes effects on soil erosionand productivity. Bruce et Al, The role of legumes in Conservation Tillage . . . p. 12.

Hargrove et al, "The need for le gumes . . . ," The role of Legunes in Conservation tillage systems.

Wagger, "Timing effects of cover crop dessication . . . ", The Role of Legumes in Conservation tillage systgems, p. 6.

Byers, "Influence of legumes on insects . . . ", The Role of legumes in conservation tillage systems, p. 61.

Koerner et al, . . . winter cover for continuous corn . . . , Role of Legumes in conservation tillage p. 57.

Harris et al, "Recovery of nitrogen–15 from labeled alfalfa residue . . . ", Role of Legumes in Conservation . . . .

Shirley, "economics of legumes cover crops . ." p. 152, Role of Legumes in conservation tillage . . . .

Bruchenhoff, "Evaluating cover crops for no–till . . . " Role of Legumes in conservation tillage systesm, p. 121.

Zaik, Crown vetch no–til silage corn, p. 100 Role of Legumes in Conservation tillage systems, p. 100.

Leidner, "Crimson clo ver and corn: . . . ", Role of Legumes in conservation tillage systems, p. 103.

Elliot et al, "cropping practices using legumes . . . " Role of Legumes in conservation tillage systems.

Chan et al, "Relay intercropping soybeans into winter wheat . . . " Agronomy J. 72:35 (Jan./Feb. 1980).

Soule et al, Farming in Nature's Image, Bibliography, Island Press, Covelo, Calif.

Neely et al, "nitrogen contribution of winter legumes . . . " Role of Legumes in Conservation Tillage systesm, p. 4.

J. Carlson, "The biggest crop from every drop" Landowner, p. 3.

* cited by examiner

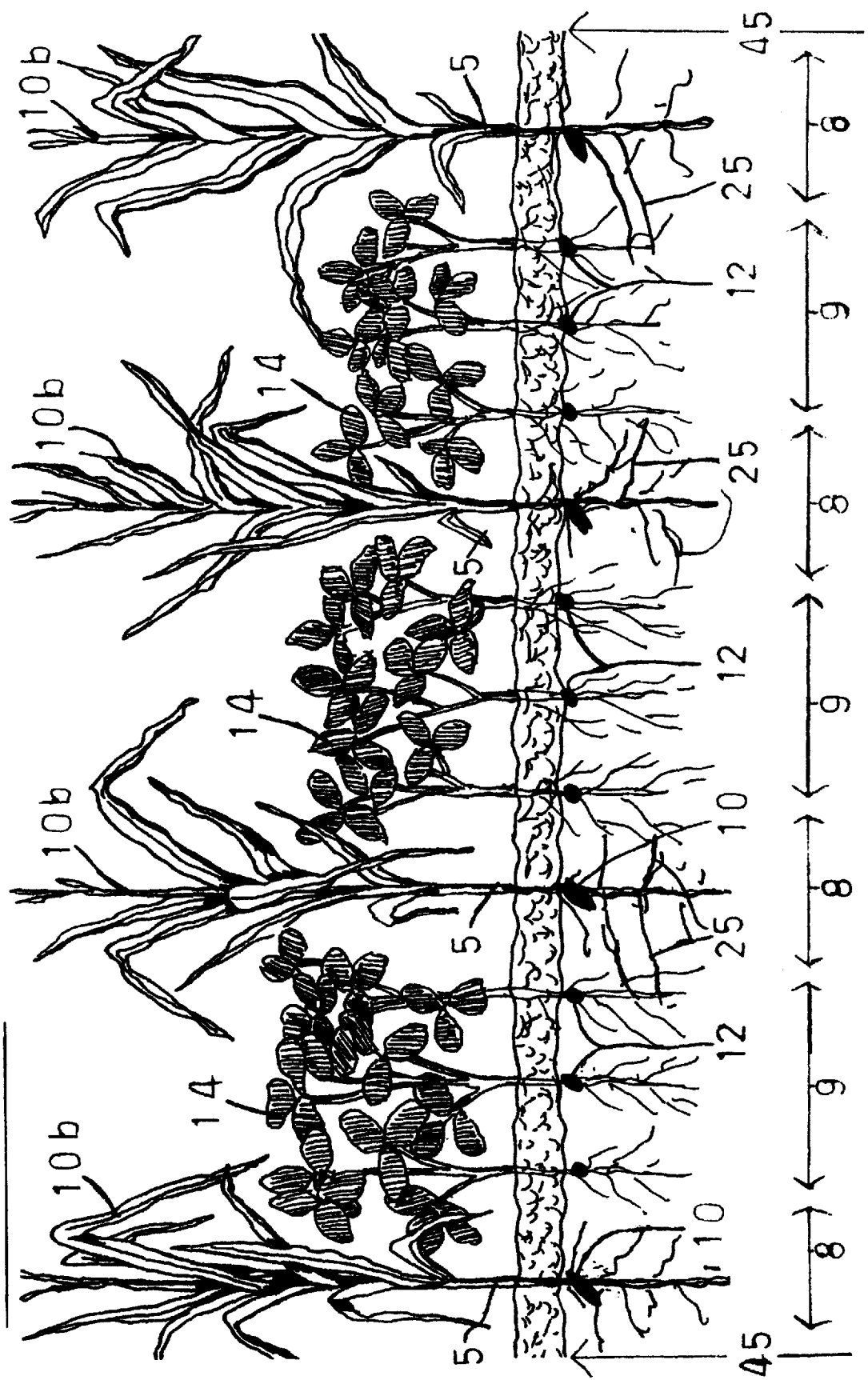

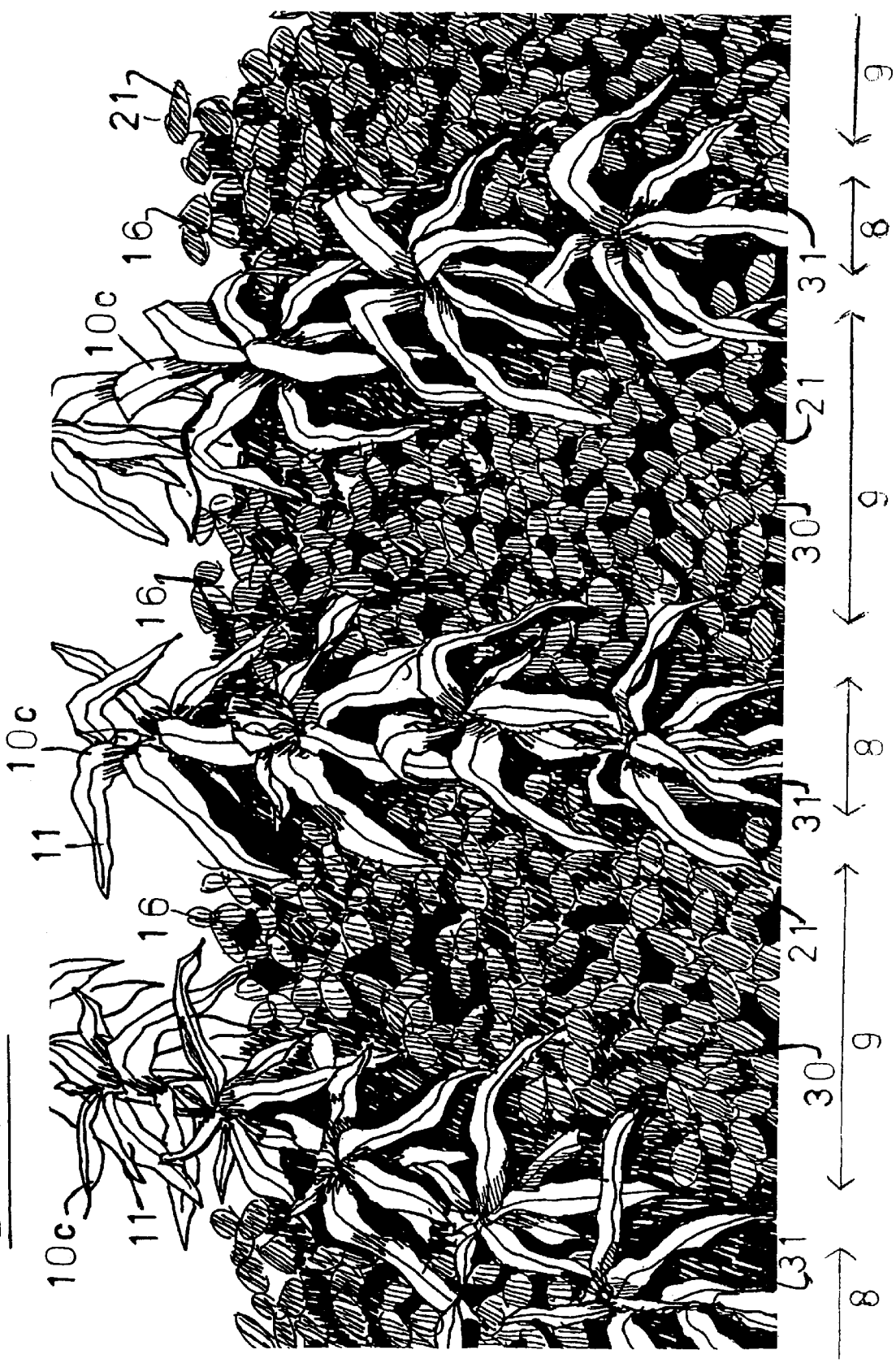

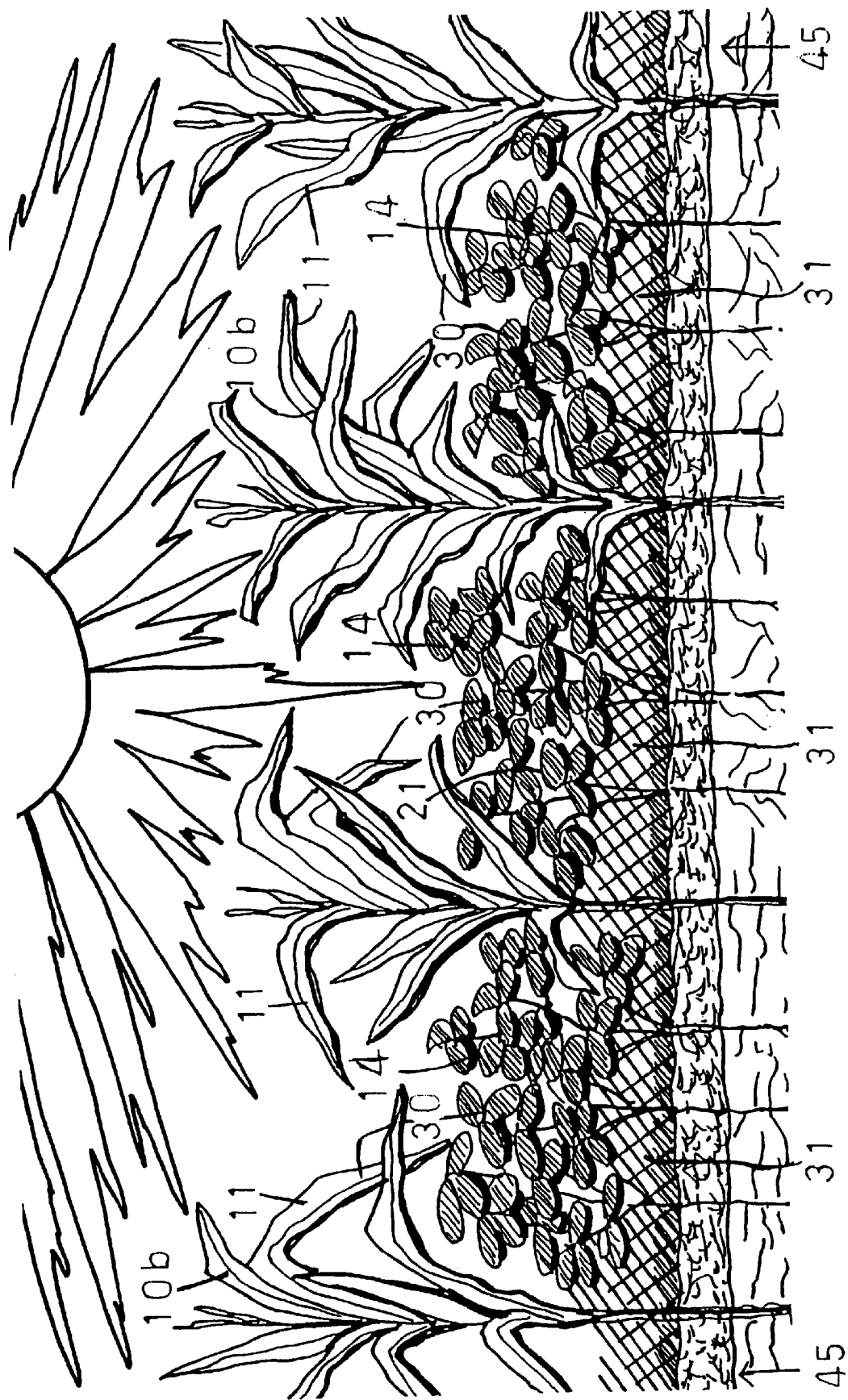

INTERCROPPING PROCESS

BACKGROUND OF INVENTION

This application is related to U.S. disclosure document No. 468,068, filed Jan. 27, 2000.

My present invention generally relates to intercropping of commercial plants. More specifically, my invention is a process by which legumes such as soybeans are alternated in rows with wild species and/or totally domesticated species such as buckwheat or corn.

My invention in the preferred embodiment and best mode is intended for commercial machine-driven agricultural methods. It is an advantage economically that my method incorporates the commercially successful conservation tillage system in the present United States. This is especially true in the Midwestern and prairie states. However, methods using hand implements for smaller suburban or urban plots with, for example, vegetable gardens are also within the scope of my invention.

A legume is a plant whose roots form an association with soil bacteria which capture and fix atmospheric nitrogen ($N_2$). These plants generally form nitrogen fixing nodules on their roots under appropriate growing conditions. Atmospheric nitrogen $N_2$ cannot be used by crops, even though the atmosphere is approximately 70 to 80% nitrogen in this form. Fortunately, nodules on legume roots can change $N_2$ to nitrogenous compounds, which can be absorbed by crops through the soil. In the United States, farmers plan soybeans for nitrogen fixing, as well as for forage and commercial purposes. However, other nitrogen fixing plants, known generically in the industry as 'green manure' (such as buckwheat), are also satisfactory.

Use of legumes to replenish soil nitrogen has been well known for centuries by those well versed in the agricultural art. Similarly, it has long been known that corn and soybeans successfully grow together under certain conditions, and that soybeans prevent rapid depletion of soil nutrients by corn.

My method for intercropping also incorporates the above described ecological benefits of intercropping a commercially successful annual legume such as soybeans, and a second commercial annual grain-crop such as corn. "Intercropping" is generally defined among farmers and agricultural scientists as: the planting of a fast growing crop between rows of a slow growing crop.

My method in its best mode need not include pesticides and herbicides to obtain healthy plants. Instead, my method in which corn and soybeans are planted at approximately the same time, insures effective ground cover and erosion resistance, in addition to grain production and soil enrichment. In the prior art soybeans, which can also be a cash crop, are generally plowed into the soil at the first frost. There they remain to decompose and release usable nitrogenous compounds in the soil for the next series of crops.

Using my improved method, there is increased drought resistance through an effective ground cover and subsoil root network, as well as an effective moisture canopy and windbreak. Moreover, my method provides a crucial development period for both soybean and corn seedlings through a microclimate effect. The fixation.of atmospheric nitrogen $N_2$ by legumes also benefits associated plants.

My process differs in that although the soybean pods are harvested early in the growing seasons, the roots and stems are left intact to provide ground cover. There also remains a subsoil root retention system during the winter months and following spring planting season.

Crops such as corn and potatoes benefit from this approach, as long as planting time is properly synchronized with that of the soybeans. The young plants cling to soybean residues and provide an anti-erosion network.

There are prior art approaches to planting annual grain crops in a predetermined fashion in one growing area. U.S. Pat. No. 5,140,917 (Swanson) describes a method and apparatus for seeding agricultural crops. In this method, seeds are placed in residue free rows which are closed aligned and associated with bands of deeply placed fertilizer. The plants from each seed are claimed to access more than one deep band of fertilizer. There is no intercropping component to Swan's model, however European Application 0132521 (Hilmer) describes intercropping with two or more crops on one piece of land per seasonal growing year. He uses the grass/grain cluster/per row or a modular cluster row planter upon a slope contour.

U.S. Pat. No. 4,084,522 (Younger) describes a method by which soybean seeds are sown into a standing grain crop (e.g. wheat). When the grain crop is ripe, it is harvested by a combine at a height which is slightly greater than the height of the partially grown soybeans.

Unlike my process, however, in Younger's model the wheat is planted first, while corn and soybeans are planted considerably later during the same growing season.

U.S. Pat. No. 6,009,955 (Tarver III) is based upon the size and shape of furrows created by a modified harvesting machine. The planter creates these furrows just prior to planting or during the planting season.

Koch described corn planted in 30 inch rows with application of insecticides and liquid nitrogen fertilizer. There is a legume ground-cover such as vetch or clover. According.to this report, clover did not demonstrate potential as a perennial cover crop. Phillip Koch, "Legume Cover Crops for No-Till Corn" in J. F. Power, THE ROLE OF LEGUMES IN CONVERSATION TILLAGE SYSTEMS (1984).

Decker et al. describes winter legume cover crops which were seeded after fall corn harvests, and which were allowed to grow until corn planting the following spring. Results indicated that fall-seeded legumes can at least partially replace artificial nitrogen fertilizers for maximum corn yields. A. M. Decker et al., "Fall Seeded Legumes' Nitrogen Contributions to No-Till Corn Production," in J. F. Power, supra.

Holderbaum reported results with legume cover crops in which legumes were grown prior to corn, but later during the same growing season. In this model the legumes were clover and ryegrass. According to this investigation, subsequent corn grain yields were highest when the cover crop was not removed. J. F. Hauderbaum et al., "Forage contributions for winter legume cover crops in no-till crop production," in J. F. Power, supra.

Scott and Burt reported intercropping red clover into corn seedlings when the corn seedlings were approximately six to twelve inches high. The scientists applied chemical herbicides to the seedlings during this investigation. According to Scott and Burt, good crops were consistently obtained by cultivating corn in a 30 inch row. Intercropping occurred when corn seedlings were approximately 12 inches in height. High corn yields consistently occurred following the plowdown of one year of red clover hay.

Scott and Burt concluded that red clover or other legume establishment by intercropping into corn might become a beneficial management approach for nitrogen replenishment, organic matter addition and reduced erosion. T. W. Scott and Robert F. Burt, "Use of Red Clover in Corn Polyculture Systems," in J. F. Power, supra.

Paudey and Pendleton reported the planting of corn seed in 1.5 meter rows with corn seedlings spaced approximately 17 centimeters apart. Three rows of soybeans were planted between single rows of corn. The investigators applied herbicides and pesticides to the seedlings during the experiments. Forty-two days after planting, the two most exterior soybean rows were ploughed into the cornrows in a traditional 'hilling up' procedure. R. K. Paudey and J. W. Pendleton, "Soybeans as a Green Manure in a Maize Intercropping System," EXPERIMENTAL AGRICULTURE 22:178–85 (1986).

Eadie et al. reported the effect of cereal cover crops upon weed control. The investigators hand planted cereal seed within plots which were approximately 2.3 meters wide and 8.0 meters long. The rows were approximately 0.75 meter equidistantly spaced. The investigators seeded the cereal cover crops immediately after the ridging cultivation at the 11–12 leave stage of cornplants.

According to the Eadie report, corn grain yields remained unchanged by cover crops seeded at the 11–12 leaf stage of corn, compared to bare soil treatment controls. Allan G. Eadie et al., "Integration of Cereal Cover Crops in a Ridge-Tillage Corn Production," WEED TECHNOLOGY 6 (3) (July–September 1992).

Lesoing and Francis stripcropped corn and soybeans to reduce erosion in eastern Nebraska from 1988 to 1990. Corn and soybeans were no-till planted in a north-south orientation in alternating 6.1 meter wide strips (eight rows, 0.76 meter between rows). Each row was approximately 46 meters in length, and each experimental planting areas comprised approximately 280 square meters.

Lesoing and Francis planted pioneer corn weed at a density of approximately 66,250 seeds/ha. Between the corn strips they planted soybean seedlings in strips of eight rows at 475,000 seeds/ha. Corn border row yields next to soybeans increased significantly compared with interior rows. These scientists suggested that water stress, light quality and shading are among the factors which affect crop yields at different stages of crop development. Gary W. Lesoing and Charles A. Francis, "Strip Intercropping Effects on Yield and Yield Components of Corn, Grain, Sorghum and Soybean: AGRONOMY J. 91: 807–13 (1999).

One farmer has reported that closer planting in rows allows more equitable distribution of sunlight, soil moisture and nutrients. NO TILL FARMER (mid-January 1986).

My new improved intercropping process solves a long-standing problem in agriculture and in the ecology generally.

Soil becomes depleted of nutrients and then eroded. Productivity for an increasing world population of people and domesticated animal decreases every year. My observation of legumes intertwined with growing crops indicates many advantages of my new intercropping process, including: A reliable source of soluble nitrogen compounds in the soil, additional humus, and prevention of erosion by underground and above ground soybean residues.

SUMMARY OF THE INVENTION

My novel method intercrops soybeans and corn in a conservation tillage situation. Corn and soybeans are planted on or about May 1, when the preferred soil temperature is approximately 60 degrees F. By growing in a non-herbicide, non-pesticide, non-irrigated area, corn and soybean plants generate a leaf canopy and an intertwining root system.

Legume nodules on the soybean roots appear shortly after root growth begins during that particular growing season. The crop leaf canopy also demonstrates a shading effect and anti-erosion effect on soil. In the preferred embodiment and best mode, planting of soybeans between cornplants is a necessary component of my novel planting method.

Another component of my invention comprises the process of planting fields or gardens in alternating rows or in other configurations, of two or more kinds of crops. In the preferred embodiment, the predetermined alternating rows and areas comprise corn or soybeans. Each crop can be in straight lines, or in curved or convoluted alignment, according to the geography of the planting area.

In the preferred mode and best embodiment, soybeans are spaced a predetermined distance from each other and each adjacent corn row. Corn and soybean roots extend approximately four feet into the soil, and intertwine at approximately four to six weeks into the growing season. For other models, conventional cash crops such as corn and buckwheat alternate with plants such as Queen Anne's lace, vinegar weed, Pennsylvania smartweed, wild grasses or cornflowers. These last named plants are often considered predominantly weedlike in nature.

Sweet clover and perennial grass are also candidates, and all the above combinations are within the scope of my invention. Other possibilities, although not exclusive, include corn and potatoes, corn and peanuts or peanuts and soybeans. The alternating configuration of crops and other appropriate plant species also provides protection against insect pests. Insects can no longer eat from once side of a field to the other, because other specially selected crops act as ecological barriers.

Moreover, by using my new planting process, edible yields are greater for the same two dimensional or three dimensional section of a field or garden. For maximum yield over a given area, crops are combined in a single bed.

Intercropping is the method of growing quick-maturing vegetable crops between slower developing crops, and maximizing use of available garden or field space. Soybeans are planted in spring or summer at 2 to 3 lb of seeds per 1,000 square feet in traditional commercial situations. Soybeans are annuals and must be reseeded every year; however, they tolerate poor drainage well, and are ideal for nitrogen fixation. Moreover soybeans, adzuki and muny beans are fairly resistant to insect pests.

Consequently, one goal of my improved intercropping method is to prevent desiccating winds from harming crops.

Another goal of my improved intercropping method is to insure that the soil is always saturated with the correct amount of organic nitrogenous residue.

Another object of my invention is to adapt my soybean corn model to a commercial model for agriculture, using a combine for tillage and drilling devices for seeding corn and soybeans.

Another goal of my invention is to add ground cover to fields which are generally uncovered and fallow.

Another goal of my invention is to decrease soil exposure to erosion from sun, wind and running water.

These and other improvements will become apparent from my detailed description and drawings of my invention.

BRIEF DESCRIPTION OF THE DRAWINGS

FIG. 1a is a lateral view of my intercropping method, with approximately three subrows of soybeans between each two consecutive rows of corn, at approximately six weeks into the growing cycle.

FIG. 3 is a partial top plan view of corn plant and soybean plant ground cover, before corn plants obtain their mature height three weeks after seeding.

FIG. 4 illustrates in lateral view the microclimate component of my corn soybean planting method at approximately six weeks into the growing cycle.

DETAILED DESCRIPTION OF THE INVENTION

Figure 1B:
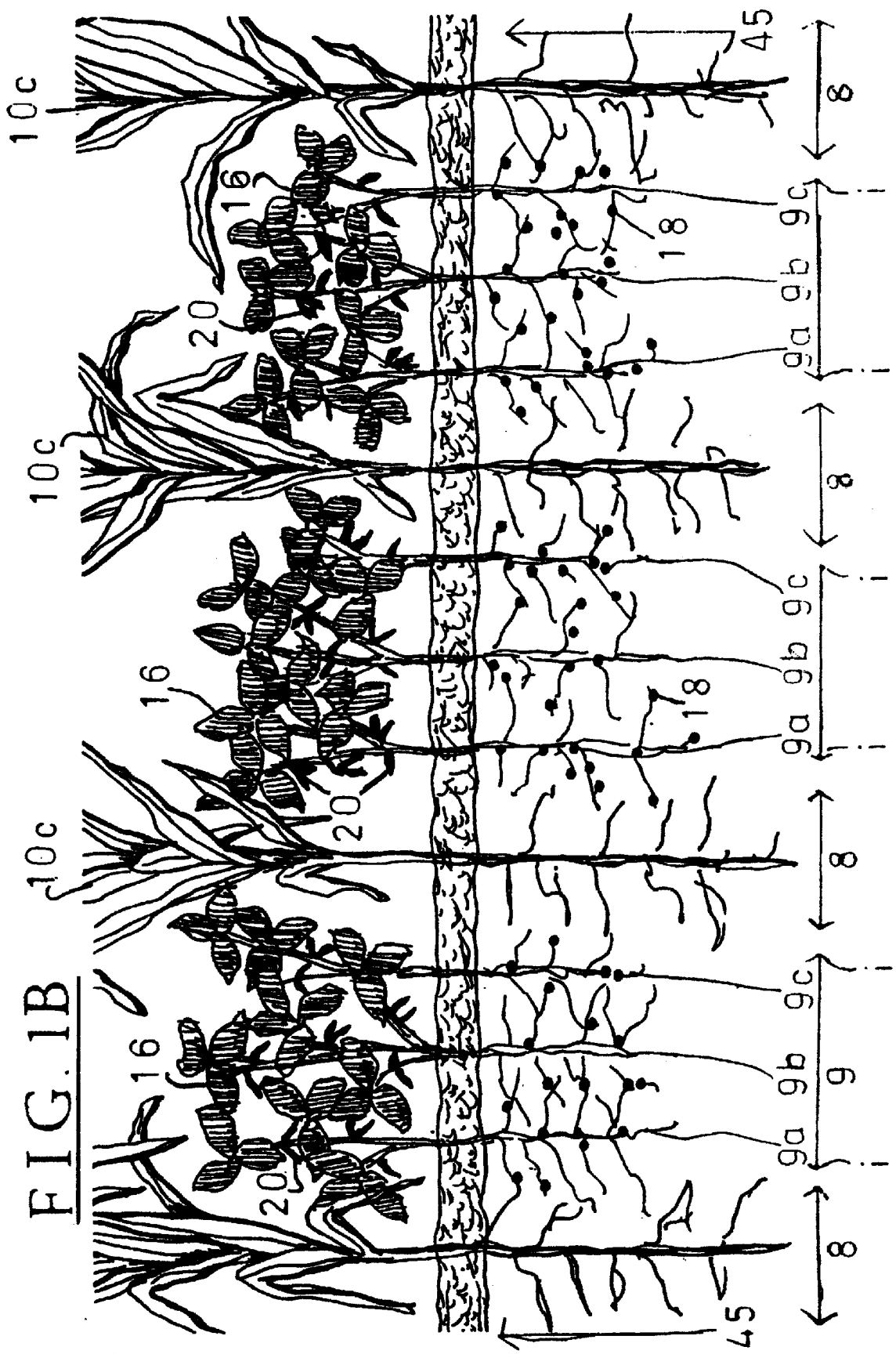
FIG. 1b is a lateral view of alternating areas of mature corn plants, and mature soybean plants with soybean pods and nitrogen fixing nodules, at approximately six weeks into the growing season.

In my preferred embodiment and best mode of the improved intercroping process, the planter begins with seed corn 10 and soybean seeds 12. Both seed types are planted approximately May 1, or whenever the soil temperature reaches approximately 60 degrees F. In particular, the planter in an actual farm or other commercial situation requires an early planting date.

In the preferred embodiment and best mode, optimal results occur in a midwestern climate with soil 45 typical of southwestern Michigan. Such soil is typically of the rimer sandy loam variety. Seed corn 10 and soybean seed 12 for my improved intercropping process is available from D & S of Galien, Mich. Corn seed 10 is from Variety No. 7059, Lot No. 61082 (Mycogen® Brand seed corn), while soybean seed 12 is variety No. 93B01, Lot. No. U22FM820 (Pioneer® brand).

The planter sows the seeds as follows:
(a) 10 inches width for each corn row 8, and which will consist of a linear arrangment of corn seedlings 10b; and
(b) 20 inches width for each soybean area 9, which will comprise a random distribution of soybean seedlings 14. Please see FIG. 1a.

In commercial applications, the operator plants soybean seeds 12 by a process known as drilling. Using this preferred method, a machine known as a seed drill disperses an approximately 20 inch wide area 9 of soybean seeds 12 between two consecutive corn rows 8. Alternatively a seed drill can sow soybean seeds 12 in an approximately seven inch wide area 9. Drilling in this manner is well known in this particular agricultural industry.

In commercial applications, the operator plants corn seed 10 in corn rows 8, by a machine well known in the agricultural industry as a corn planter. Each corn row 8 is approximately thirty inches in width, and each corn seed 10 is approximately four inches deep into the soil 45. Corn seedlings 10b are eventually thinned to approximately eight inches apart, but they are initially overplanted to compensate for loss in small growing areas. In commercial fields greater than approximately three acres, the initial overseeding step is unnecessary.

In the best mode of my intercropping method, soybean seeds 12 are sowed in predetermined approximately 20 inch wide soybean areas 9 between each two consecutive corn rows 8. Soybean seeds 12 are drilled approximately two inches to three inches deep into the soil 45. There are approximately eight to 20 soybean seeds 12 per square foot at this time in my intercropping method.

Figure 2:
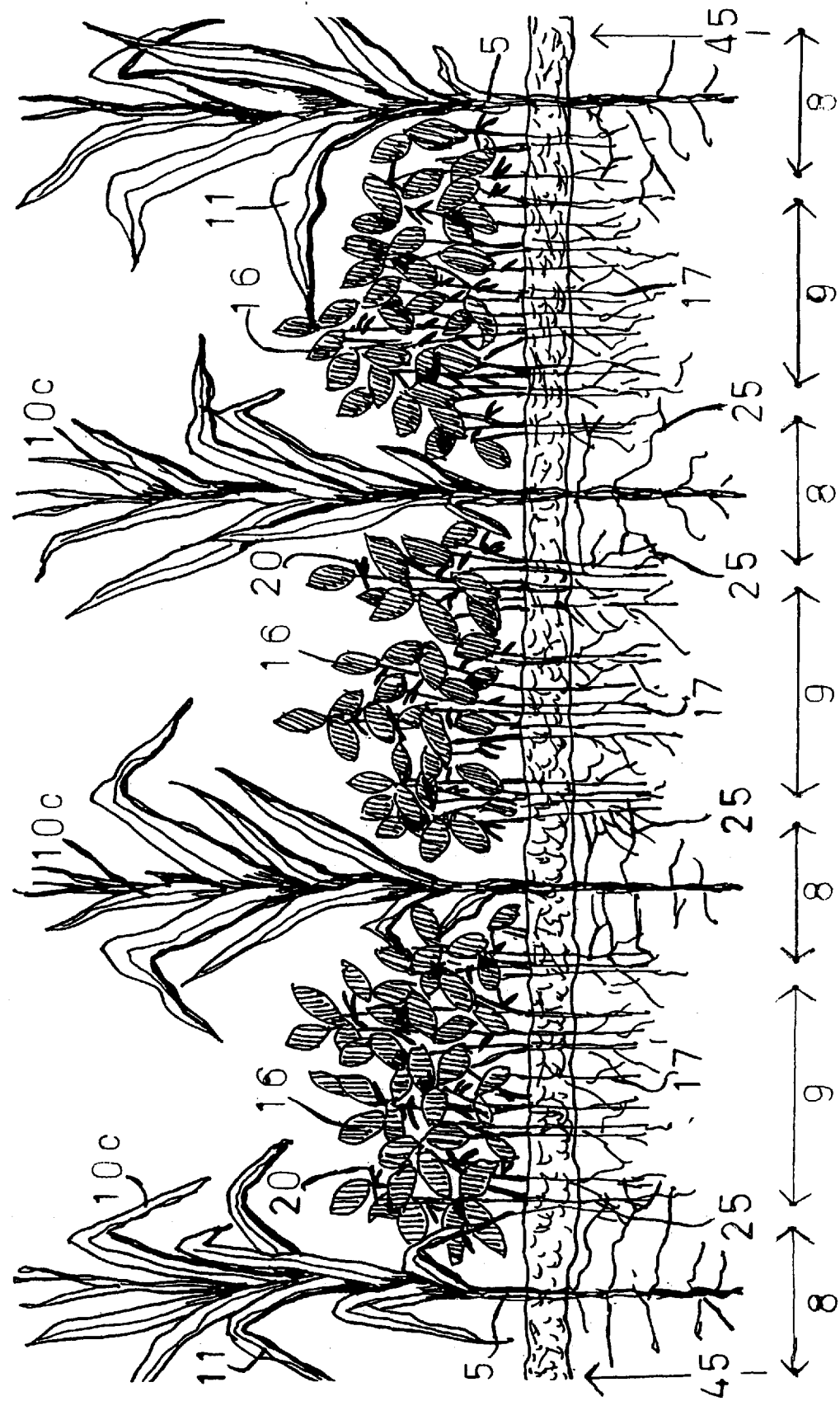
FIG. 2 is a lateral view of the preferred embodiment with soybean seedlings spread evenly over an approximately 20 inch wide area between consecutive corn plant rows, and at approximately six weeks into the growing cycle.
Figure 3A:
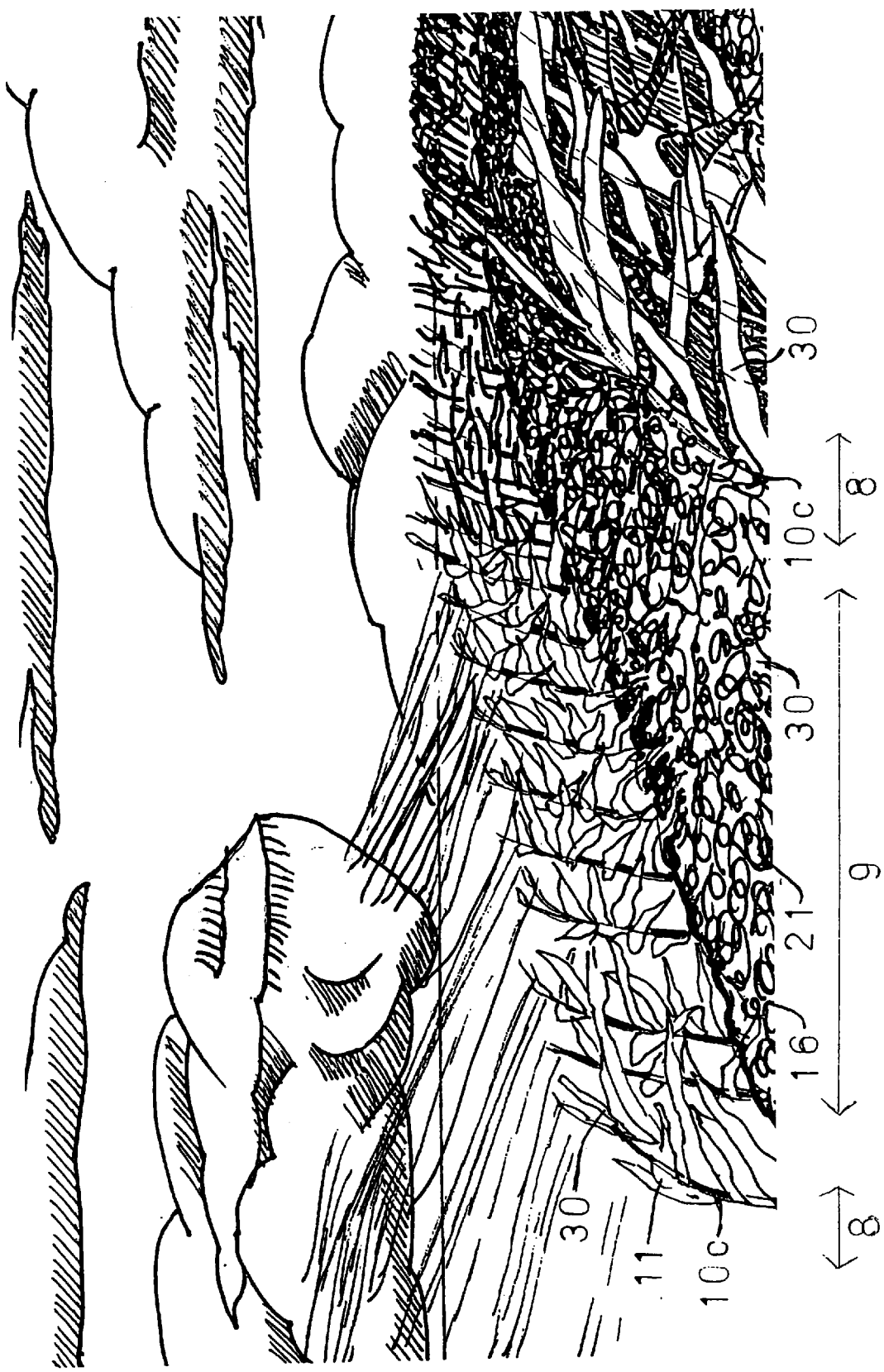
FIG. 3a schematically illustrates the windbreaking effect of intercropped corn plants and soybean plants, and at approximately six weeks into the growing cycle.

In another embodiment, approximately three adjoining mature soybean plants 16 form (i) predetermined subrows 9a, 9b, 9c and (ii) within approximately 20 inch wide soybean area 9 between two consecutive corn rows 8. Please see FIG. 1b. However, in the preferred embodiment, numerous soybean plants 16 are more randomly and more densely initially seeded within the predetermined width of approximately 20 inches of soybean growing area 9. Please see FIGS. 2 and 3.

Each corn row 8 is approximately 10 inches in width and contributes width to the soybeans rows 9 of approximately 10 inches. This is because corn plant leaves 11 grow into and above the uppmost portions of soybean plants 16, thus overlapping growing areas. Please see FIG. 3. Therefore, corn plans 10c protrude into soybean rows 9 for approximately a total of twenty inches. The total width between two consecutive corn rows 8, as measured from opposing cornstalks 5, is approximately 20 inches at maturity. However, newly seeded corn rows 8 are generally 30 inches apart.

Each corn seed 10 is also equidistantly spaced from the other by approximately eight inches. This approach is preferred, if corn seed 10 and soybean seed 12 are initially planted in weed-free soil 45.

In the preferred embodiment and best mode, there is no weed spray or fertilizer. However, it is satisfactory to use any generic nitrogen adding fertilizer for corn and soybeans in other embodiments of my method. It is important that no vinelike plant be intercropped with mature corn plants 10c: the vines of plants such as pole bean cause physical stress on mature corn plants 10c by twining upon cornstalks 5. This same prohibition applies to pumpkins and watermelons, to name but a few.

The operator obtains a substantially a weedfree growing area by minimal tillage mechanical devices well known in this agricultural industry. Two such examples include a garden tiller and a seed bed tiller. When initially seeding, the operator should orient corn rows 8 and soybean rows 9 in an west-east direction for optimal sunlight. There should be approximately one or two corn seeds 10 per square foot, so that there are approximately one or two mature cornplants 10c per square foot. Soybean seeds 12 are initially planted at approximately 16 seeds per square foot, and eventually thinned to approximately eight planes per square foot. The operator should till the soil 45 at least nine to 14 inches deep within the entire planting area. The planting of fields in predetermined alternating rows and areas (approximately 20 inches width for a corn row 8 and approximately 20 inches width for soybean area 9) comprises double planting. Using this method, there is no additional cost to the farmer using this best mode, except for the cost of seed.

The planter waters all planted seeds with approximately 25 gallons of water per 20 foot by 20 foot growing area, to hasten germination of corn seeds 10 and soybean seeds 12. By using this approach commercially acceptable soybean pods 20, as well as soybean root nodules 18 fully develop. Please see FIG. 1B. The growing area does not require additional water for development of a satisfactory above ground leaf canopy and roots. This is true, even if near-drought conditions subsequently exist during a particular growing season.

In addition to creating an effective root network and leaf canopy, the preferred embodiment produces commercially acceptable soybean pods 20. The harvesting machine in this preferred method comprises the following characteristics:

1. There is approximately six to seven feet of clearance from the soil to the bottom edge of the machine. The machine is on a stilted track system which allows the machine to move between corn rows 8 without disturbing cornstalks 5 containing corn ears.
2. There should be a front wheel drive track system which is approximately ten to twenty inches wide, and which is located posterior to an approximately 20 inch wide grain collecting head. These grain collecting heads are lowered between consecutive corn rows 8. The heads clear a trail for tractors, thereby leaving cornstalks 5 intact to dry.
3. A head is a removable component of all combines. Combines pick grain and the grain then moves to to the thrasher component of the combine. All combines have two heads (one for corn rows 8, one for wheat or soybean areas 9). Most combines are approximately ten feet wide and most heads are approximately 20 feet wide. Heads are mounted upon the anterior portion of the combine, and they pluck the grain posteriorly and laterally before the combine drives over the remaining plants.

Figure 7:
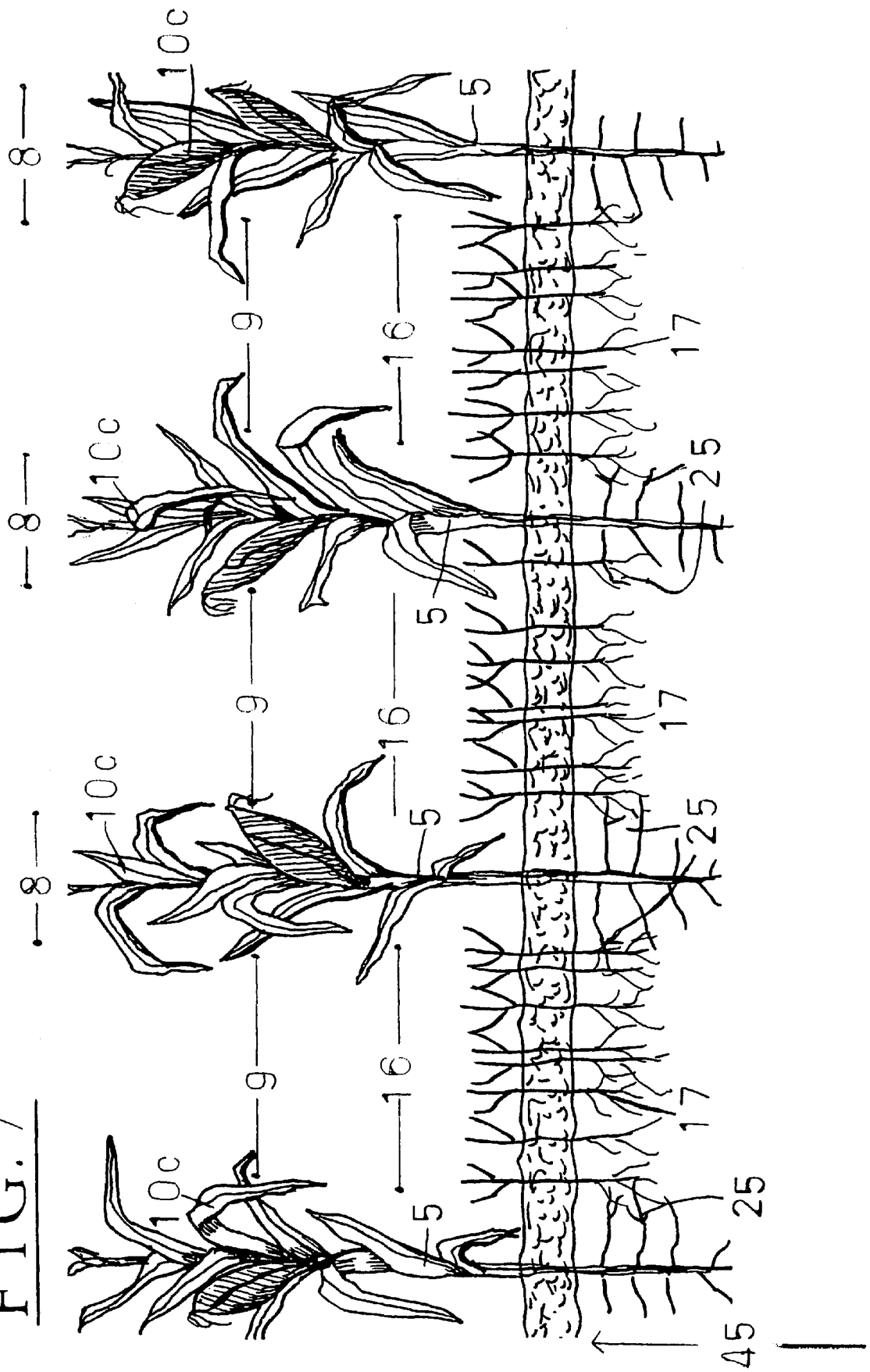
FIG. 7 illustrates mature soybean plants which remain after harvesting pods and without disturbing cornstalks.

Prior to the corn harvest, in mid September through October as soybeans dry in the field, there should be four or more twenty inch independent heads. These heads cut mature soybean plants 16 and leave a three inch stubble without disturbing cornstalks 5. The mature soybean leaf canopy dries and falls to the ground as mulch 46, although the roots remain intact over subsequent winter months. Please see FIG. 7.

At the time of harvest, mature soybean plants 16 are approximately three feet high and mature corn plants 10c are approximately nine feet high. However, most of the corn ears are approximately three feet to six feet above soil 45.

The preferred timetable for planting in my above described, improved intercropping method is as follows:

First week: Reseed any corn seed 10 and soybean seed 12 if necessary.

Second week: Nodules 18 appear upon sprouted soybean seedlings 14. Approximately twenty days after drilling, corn seedlings 10b are approximately 14 inches in height, and soybean seedlings 14 are approximately ten inches in height.

Figure 6:
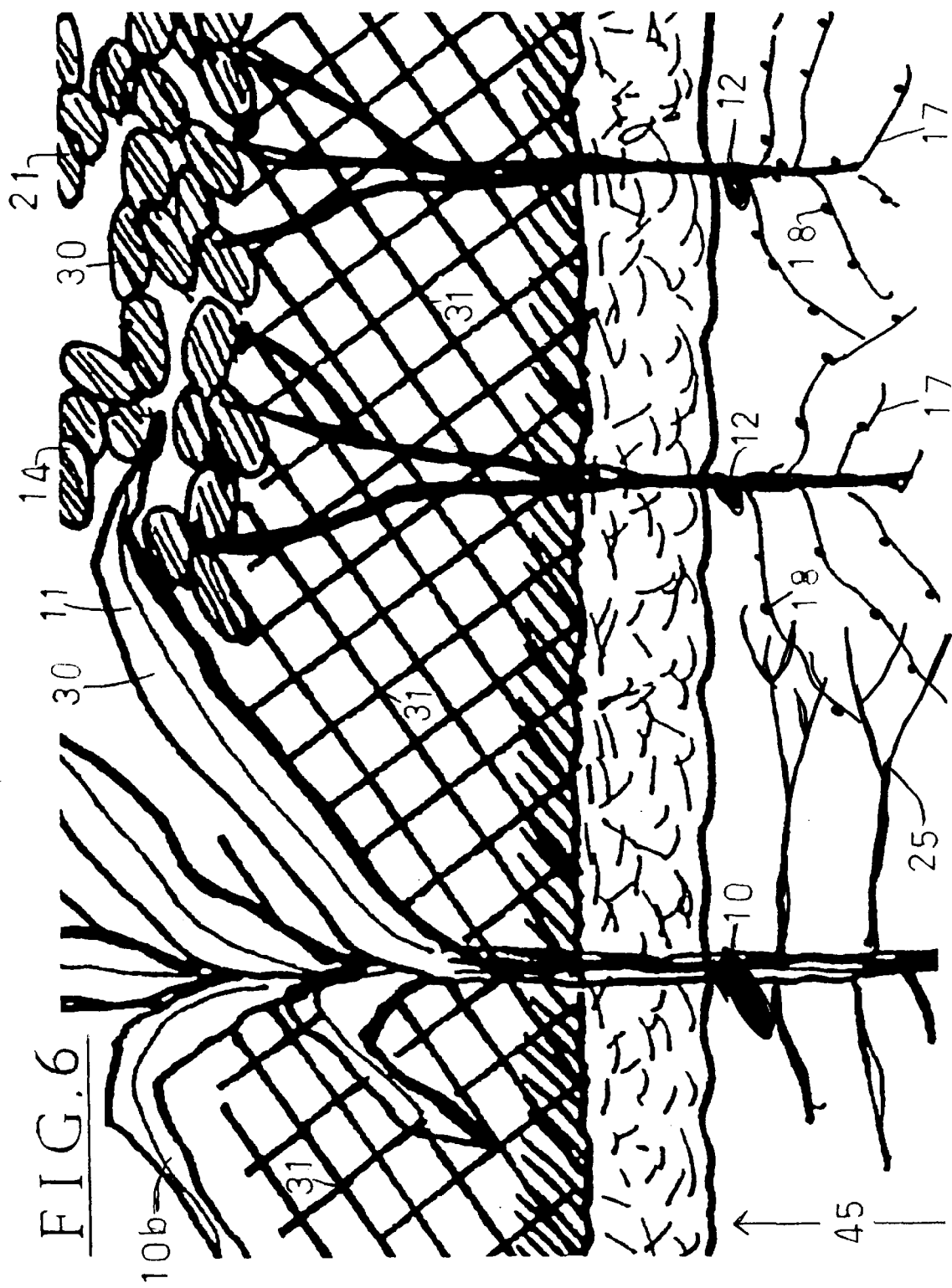
FIG. 6 is a closeup view of the microclimate component of my planting process at approximately two weeks into the growing cycle.

Third week: Leaf canopy 30 and microclimate 31 are fully developed. Please see FIGS. 3, 4 and 6.

Fourth week: Corn seedlings 10b are thinned to one plant for every eight linear inches. Soybean seedlings 14 are thinned to approximately eight seedlings per square foot. Corn seedlings 10b are at least approximately 20 inches in height. Developing leaf canopy 30 shades most weeds from sunlight.

Fifth week: Root nodules 18 appear on soybean roots 17. Corn leaves 11 and soybean leaves 21 shade soil 45, when corn plants 10c are approximately thirty inches in height and soybean plants 20 are approximately 20 inches in height.

Sixth week: Maturing corn plants 10c and maturing soybean plants 16 continue to shade soil 45. In the best mode and preferred embodiment, corn plants 10c are approximately 30 inches in height and approximately twenty inches wide. Mature soybean plants 16 create a predetermined area which is approximately 16 inches wide, while each individual soybean plant 16 is approximately 20 inches high.

This means that if there is a row of cornplants 10c within ten inches width originally allowed for corn row 8, then there will be five inches on either side of corn plants 10c prior to first soybean plants 16. Soybeans are a faster growing crop than corn, although their growing cycles are similar.

To summarize, the operator seeds corn plants 10c in the middle of the ten inch width row: corn roots 25 require approximately six weeks to grow sufficently to compete with mature soybean plants 16 for nitrogen.

Planted in this manner, mature corn plants 10c and soybean plants 16 exhibit resistance to near drought conditions. During the summer, the corn roots 25 are massive and intertwine soybean roots 17 which were planted at the same time the previous late spring.

Figure 8:
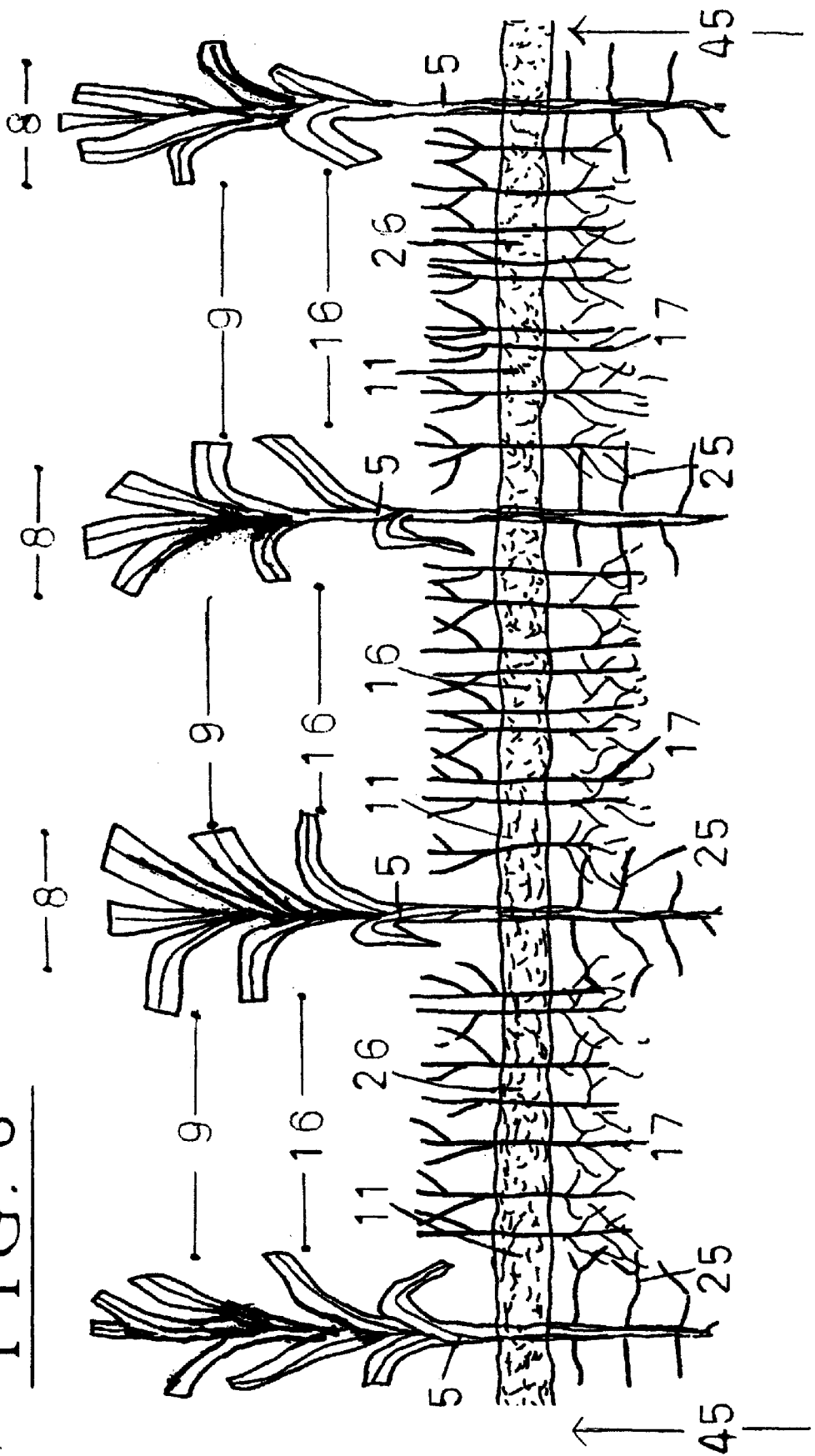
FIG. 8 illustrates roots which hold soil in place during winter.

During fall and winter, soybean roots 17, even after the first frost, remain physically intact, and above soil soybean plants 16 remain interwoven with remaining cornstalks 5. Please see FIG. 8. Intertwining roots 17, 25 are thickest with approximately five inches between the deceased area of mature soybean plants 16 and mature corn plants 10c. Please see FIG. 8.

During midwinter, there are no root nodules 18 on dead soybean roots 17, although they were present during the previous summer. However, non-viable physical roots 17, 25 remain intact throughout the winter; this occurs although non-viable structural cornplants 10c and soybean plants 16 above the soil 45 have decayed.

In addition to anti-erosion effect of roots 25, a ten inch wide row of intercropped corn.plants 10c exhibits a windbreaking effect. This effect is most noticeable upon the lower stems and leaves of soybean plants 16.

Moreover, every intercropped area of mature soybean plants 16 provides an effective windbreak for a stripcropped row of mature cornplants 10c (from approximately the first foot of mature soybean plant 16 height). Three weeks after sprouting, intertwining mature corn plants 10c and mature soybean plants 16, create one field into an effective windbreak. Every stripcropped corn row 8 is an effective windbreak to a distance of approximately 30 feet. Please see FIG. 3a.

A row 8 of mature corn plants 10c is approximately 50% (fifty percent) permeable as a windbreak. The equation for windbreak effect in this particular industry is six times the height of the mature soybean plants 16. A plot planted in the above described manner with mature corn plants 10c and mature soybean plants 16 acts as one unit, and has the same windbreak effect in every direction.

Figure 5:
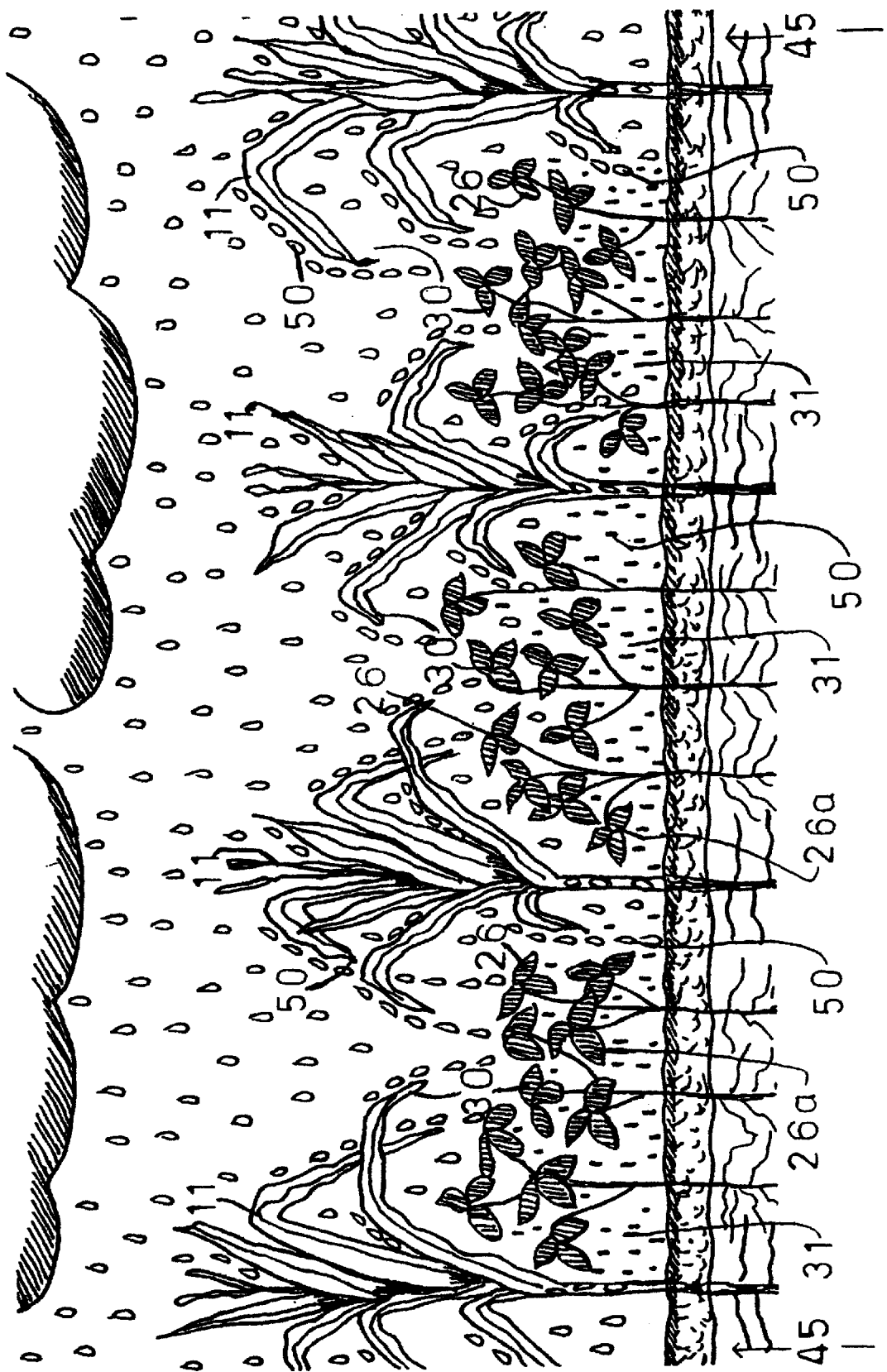
FIG. 5 illustrates the leaf drip/soil to gullet to pocket component of my corn/soybean planting method at approximately six weeks into the growing cycle.

Another beneficial feature of my process is greater retained soil surface moisture, in addition to the shading effect of leaves and stems. As illustrated in FIG. 5, corn leaves 11 act as moisture collecting vehicles, as do soybean leaves 26. Corn leaves 11 collect moisture 50 which drops onto soybean seedling leaves 26a (from rain and dew derived moisture).

In effect, there is a leaf-drip to leaf or gullet to leaf pocket to soil pathway for moisture to collect under leaf canopy 30. Mature soybean plants 16 and mature corn plants 10c both collect moisture throughout the growing season in this manner, in additional to artificial means such as irrigation.

The windbreak effect overlaps with this moisture collection feature to raise surface soil and subsurface soil water content. This combined microclimate feature 31 raises moisture content of the soil and.the humidity level beneath the soybean/corn seedling leaf canopy for a height of approximately one foot above soil 45. Please see FIG. 6. As illustrated in FIG. 4, leaf canopy 30 also prevents evaporation from direct wind and sunlight, thus acting as a microinsulator. The windbreak effect is cumulative and creates a zone of less air movement and low light intensity.

Fertilizer is unnecessary in the best mode and preferred embodiment of my invention. However, in other embodiments of my invention, the planter can apply commercial fertilizer uniformly throughout soil 45 to a depth of approximately eight inches, and in a concentric manner around each row of plants. Because the planter seeds soybean seeds 12 and corn seeds 10 at the same time in late spring, both plants mature within approximately 100 days.

What is claimed is:

1. A process for intercropping an annual crop which comprises soybeans and corn, said crop comprising only non-vine plants, said intercropping process lacking application of an artificial herbicide, said process lacking an artificial pesticide, and said process lacking artificial fertilizer, said process comprising the following steps:
   (a) simultaneously planting soybean seeds in areas and corn seeds in rows, said corn rows width and said soybean areas being in a continuous pattern in which they alternate with each other, said planting occurring at the beginning of May of each growing season,
   (b) thinning said corn seedlings and said soybean seedlings approximately 4 weeks after said planting,
   (c) weeding said rows and said areas without said artificial herbicides, and
   (d) leaving soybean stalks and cornstalks, said soybean roots and corn stalks and corn roots intact in said rows and said areas over the winter season, said intact roots of said corn and said soybeans thereby intertwining and forming an effective subsoil network.

2. The process for intercropping soybeans and corn as described in claim 1, said process occuring in an initially weedfree growing area, said weedfree growing area obtained by tillage by a garden tiller and a seed bed tiller in an east-west direction.

3. The process for intercropping corn and soybeans as described in claim 2, wherein said soybean seed is planted in approximately 20 inch wide areas, said consecutive newly seeded corn rows generally being approximately thirty inches apart, each said corn row comprising said corn seeds spaced at equidistant intervals of approximately eight inches.

4. The process for intercropping corn and soybeans as described in claim 2, wherein said corn seeds are seeded by a conventional corn planter machine, and said soybean seeds are seeded by a conventional seed drill machine, said soybean seeds being drilled approximately two to three inches deep into said soil.

5. The process for intercropping said corn and said soybeans as described in claim 4, wherein said soybean seeds are initially spaced at approximately eight plants per square foot, and said corn seeds are initially spaced at approximately one to two corn seeds per square foot, said soybeans and corn seed when soil temperature is approximately sixty degrees Fahrenheit.

6. The process for intercropping soybeans and corn as described in claim 5, wherein said corn leaves and said soybean leaves form a water/gullet system at approximately two weeks into said growing season, said corn plans and said soybean plants forming a microclimate effect, said soybean roots and said corn roots intertwining during the growing season.

7. The intercropping process as described in claim 6, wherein said soybean seeds are mechanically drilled into the soil, said mechanical drilling dispersing an approximately twenty inch wide area of soybean seeds in three seven-inch wide rows between two said consecutive corn rows, said corn seed planted by a mechanical corn planter, each said corn seed being planted approximately four inches deep into said soil, said corn seedlings eventually being thinned to approximately eight inches apart.

8. The intercropping process as described in claim 6, wherein the operator obtains a weedfree growing area, said corn seed being planted at approximately one to two corn seeds per square foot, there being approximately one to two mature corn plants per square foot, said soybeans being initially planted at approximately sixteen seeds per square foot, said soybeans being eventually thinned to approximately eight plants per square foot, said soil being tilled at least nine to fourteen inches deep.

9. The intercropping process as described in claim 6, wherein said corn plants and said soybean plants are watered with approximately twenty-five gallons of water within a 20 foot by 20 foot square growing area at the time of seeding, said intercropped corn comprising a windbreaking effect to a distance of approximately 30 feet at approximately three weeks after sprouting.

10. The intercropping process as described in claim 9, wherein there are five inches between a deceased area of mature soybean plants and a deceased area of mature corn plants.

11. A process for intercropping an annual soybean and corn crop, said process consisting solely of corn and soybeans, said process eliminating vine-like plants, said process eliminating artificial herbicides, said process eliminating artificial pesticides, said process eliminating artificial nitrogenous fertilizers, the steps for said process comprising:
   (a) simultaneously planting soybean seeds in areas and corn seeds in rows, said areas and said rows alternating with each other, said planting occurring in rimer sandy loam soil, each said corn row consisting of a linear arrangement of corn seedlings, each said corn row being approximately 30 inches from a consecutive said corn row,
   each said soybean area comprising an approximately twenty inch wide width, said soybean area width comprising three subrows of said soybean seeds, each said subrow comprising a width of approximately seven inches,
   (b) watering said rows and said areas solely during initial seeding of said corn and soybean seeds,
   (c) weeding said rows and said areas without said artificial herbicides, and
   (d) harvesting said soybeans and said corn, while leaving said cornstalks and said cornroots and said soybean stalks and said soybean roots in the field over the winter and following spring planting season, thereby creating a ground cover, said process thereby producing commercial acceptable soybean pods, said process producing said soybean pods under near-drought conditions.

12. The intercropping process as described in claim 11, wherein said soybean seeds are drilled approximately two to three inches deep in the soil, there being approximately eight to twenty of said soybean seeds per square foot of said soil.

* * * * *